United States Patent [19]
Stephens et al.

[11] Patent Number: 5,734,319
[45] Date of Patent: Mar. 31, 1998

[54] METHOD OF DETERMINING THE INFLATION PRESSURE OF A TIRE ON A MOVING VEHICLE

[75] Inventors: Paul Stephens, West Midlands; Lavinder Singh Rehal, Coventry; John Charles Walker, West Midlands, all of England

[73] Assignee: Sumitomo Rubber Industries, Ltd., Hyogo-ken, Japan

[21] Appl. No.: 606,533

[22] Filed: Feb. 23, 1996

[30] Foreign Application Priority Data

Mar. 2, 1995 [GB] United Kingdom ............... 9504217

[51] Int. Cl.$^6$ ............................. B60C 23/00; B60C 23/02
[52] U.S. Cl. .................... 340/442; 340/444; 73/146.2; 73/146.5
[58] Field of Search ............................... 340/438, 442, 340/444, 443; 73/146.2, 146.5

[56] References Cited

U.S. PATENT DOCUMENTS

| | | | |
|---|---|---|---|
| 4,866,419 | 9/1989 | Kyrtsos et al. | 340/443 |
| 4,876,528 | 10/1989 | Walker et al. | 340/442 |
| 5,192,929 | 3/1993 | Walker et al. | 340/444 |
| 5,218,862 | 6/1993 | Hurrell, II et al. | 73/146.5 |
| 5,228,337 | 7/1993 | Sharpe et al. | 73/146.5 |
| 5,239,469 | 8/1993 | Walker et al. | 340/444 |
| 5,252,946 | 10/1993 | Walker et al. | 340/444 |
| 5,303,330 | 4/1994 | Gersho et al. | 395/24 |
| 5,469,528 | 11/1995 | Douglas et al. | 395/10 |
| 5,483,220 | 1/1996 | Kushimoto et al. | 340/444 |
| 5,499,371 | 3/1996 | Henninger et al. | 395/700 |
| 5,541,573 | 7/1996 | Jones | 340/442 |
| 5,552,760 | 9/1996 | Jones | 340/444 |

FOREIGN PATENT DOCUMENTS

| | | |
|---|---|---|
| 0291217 | 11/1988 | European Pat. Off. . |
| 0545641 | 6/1993 | European Pat. Off. . |
| 0647536 | 4/1995 | European Pat. Off. . |
| 0652121 | 5/1995 | European Pat. Off. . |
| 4337443 | 5/1995 | Germany . |

OTHER PUBLICATIONS

Patent Abstracts of Japan, vol. 012, No. 227 (M-713), 28 Jun. 1988 & JP-A-63 022707.

Patent Abstracts of JAPAM, vol. 008, No. 032 (M-275), 10 Feb. 1984 & JP-A-58 188704.

*Primary Examiner*—Jeffery Hofsass
*Assistant Examiner*—Timothy Edwards, Jr.

[57] ABSTRACT

A method of determining the inflation pressure of one or more pneumatic tires on a moving vehicle having a plurality of n wheels fitted with tires by performing a set-up procedure comprising, for a range of tire inflation set-up procedure comprising, for a range of tire inflation pressures including all the vehicle tires at their scheduled inflation pressure and combinations of one or more tires at a range of pressures below their scheduled and for a range of vehicle speeds and driving conditions such as accelerating, braking, straight-ahead driving and cornering, deriving for each of the wheels a speed value Cn proportion to the wheel angular velocity, determining and saving the relationship of the set of set-up speed values to each related tire pressure, and subsequently in normal driving monitoring at intervals of time the wheel speed signals of the wheels on the vehicle, deriving an equivalent set of normal driving speed values based on these monitored wheel speed signals, obtaining the associated tire inflation pressures. The method may utilize a trainable information processing system such as a neural network to map the speed values onto the set of tire inflation pressures. The method may particularly be applied to detecting a deflated tire on a vehicle.

17 Claims, 3 Drawing Sheets

METHOD OF DETERMINING THE INFLATION PRESSURE OF A TIRE ON A MOVING VEHICLE

This invention is directed a method of determining the inflation pressure of a tire on a moving vehicle and more particularly to detecting a partially or totally deflated pneumatic tire on a moving vehicle.

BACKGROUND OF THE INVENTION

Prior art methods of measuring tire pressures on moving vehicles utilize radio transmitters associated with the rotating tire and wheel, or communicating tubes with rotating seals at the vehicle hub which lead to fixed pressure sensors on the vehicle body. Such devices are expensive and/or unreliable.

There also exist proposals to detect deflated tires by comparing with the other tires on the vehicle. One such system utilizes wheel speed signals from the vehicle wheels such as, for example, the signals from anti-lock braking systems being fitted to an increasing proportion of modern vehicles. These recent deflation warning systems compare the vehicle wheel speed signals in various ways in order to attempt to identify the small increase in wheel speed caused by the extremely small change in the tire rolling radius which occurs when pressure is lost from the tire. There are two major problems which these systems have to overcome. The first problem is the avoidance of false warnings by distinguishing reliably between changes in wheel speed due to tire deflation and those changes due to vehicle factors such as cornering, braking, accelerating and uneven or changing loads which can easily cause changes in speed signals which are very much larger than those due to tire deflation. The second problem is to provide a warning in a sufficiently short period of time that the vehicle driver may take action to avoid further damage to the tire or in an extreme case of deflation, an accident to the vehicle.

The deflation warning system described in European Patent Publication No. 0 291 217 has largely overcome both of the major problems described above and provides for a four-wheeled vehicle a method which will successfully warn of a deflated tire in most normal driving situations. However such a deflation warning system requires the prior determination of certain vehicle related constants which may be often specific only to one particular make and model of vehicle. Such constants can only be determined by monitoring of the vehicle wheel speeds under exhaustive set up procedures followed by complex analysis of the resultant data by expert statisticians and vehicle engineers. Such time and expense of refining the method is thus prohibitive of the development of a universal deflation warning system having maximum reliability and suitability for any vehicle.

Even the above systems however do not measure tire pressures and when used to sense deflations require complex setting up, including, for example, determining complex vehicle related constants.

SUMMARY OF THE INVENTION

It is an object of the present invention to overcome the disadvantages of the above prior art providing a system which is easily set up without the need to determine vehicle constants and also to give tire pressure measurements.

According to the invention, there is provided a method of determining the inflation pressure of one or more pneumatic tires on a moving vehicle having a plurality of n wheels fitted with tires characterised by performing a set-up procedure comprising, for a range of tire inflation pressures including all the vehicle tires at their scheduled inflation pressure and combinations of one of more tires at a range of pressures below their scheduled pressure and for a range of vehicle speeds and driving conditions such as accelerating, braking, straight-ahead driving and cornering, deriving for each of the wheels a speed value (Cn) proportional to the wheel angular velocity, determining and saving the relationship of the set of set-up speed values to each related tire pressure, and subsequently in normal driving monitoring at intervals of time the wheel speed signals of the wheels on the vehicle, deriving an equivalent set of normal driving speed values based on these monitored wheel speed signals, obtaining the associated tire inflation pressures.

In a simplest embodiment, sets of wheel speed values and related tire pressures are saved for a full range of vehicle operating conditions. This comprises the set up procedure and subsequently each set of speed values monitored during normal driving of the vehicle are used to determine the tire pressures.

More preferably, the pressures are obtained by the set up procedure teaching a trainable information processing system to map the speed values onto the set of tire inflation pressures. The trainable information processing system may be a neural network. One preferred type of neural network is a Multi-Layer Perceptron Network.

Speed parameters may be used as intermediaries between the speed values and the relationship for determining the relationship more effectively. The intermediary speed parameters may comprise an average speed parameter and/or the difference in the sum of wheel speed values of wheels at the front and rear of the vehicle and/or the difference in the sum of wheel speed values of wheels on the left and right side of the vehicle and/or the difference in the sums of wheel speed values of diagonally opposed groups of wheels.

Preferably the vehicle may have any number of wheels greater than two. In the case of a four-wheel vehicle the speed parameters preferably comprise eight speed parameters.

In the case of a two-wheeled vehicle, a further signal determined by the suspension deflection is used as a "speed" value.

The speed values are preferably supplied by speed signals from the wheel signal generators of an electronic anti-lock braking system.

In another aspect of the invention, a comparison may be carried out with the expected pressures to determine when one or more of the tires is deflated and generating a warning signal when necessary.

BRIEF DESCRIPTION OF THE INVENTION

Further aspects of the invention will become apparent from the following description, by way of example only, of embodiments of the invention in conjunction with the following drawings in which.

DETAILED DESCRIPTION OF THE INVENTION

Figure 1:
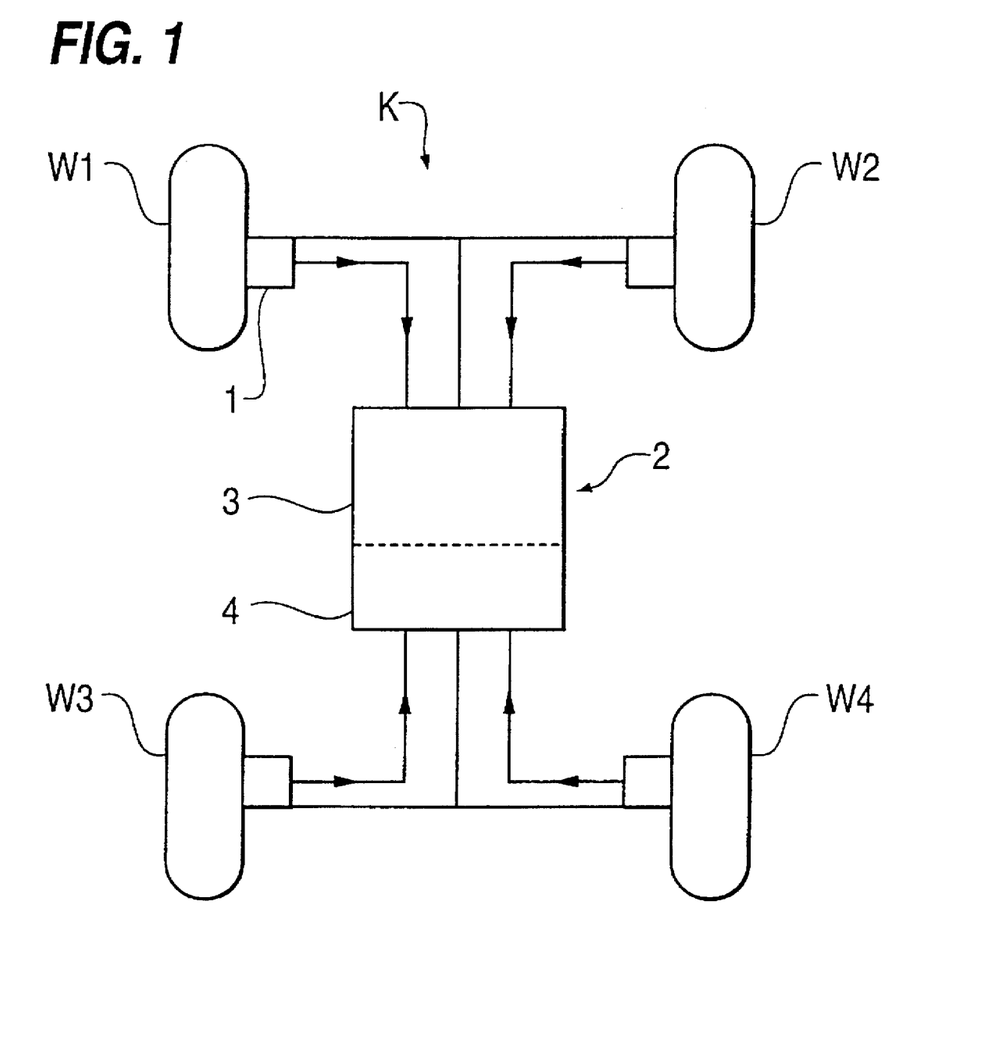
FIG. 1 shows a schematic diagram of a passenger car showing the four wheels, for a first embodiment of the invention.

The passenger car K shown in FIG. 1 is a saloon model having four wheels W1-W4 located at the front left side, front right side, rear left side and rear right side of the vehicle respectively. The car was fitted with an industry standard electronic antilock braking system (ABS) utilizing at each of the four wheels W1–W4, a wheel signal generator producing a signal comprising 96 pulses for each revolution of the wheel. An antilocking braking system 1 has a pulse generator or wheel speed signal means associated therewith, which transmits the pulse to a microprocessor 2 comprising computing means 3 and data storage means 4 (See FIG. 1). The car was additionally fitted with computerised equipment for counting the number of pulses C1–C4 produced from the wheel signal generators of each wheel W1–W4, respectively, in consecutive 5-second periods. The car was also provided with means for storing this data and also separately inputting and storing the inflation pressures of each of the tires.

Figure 2:
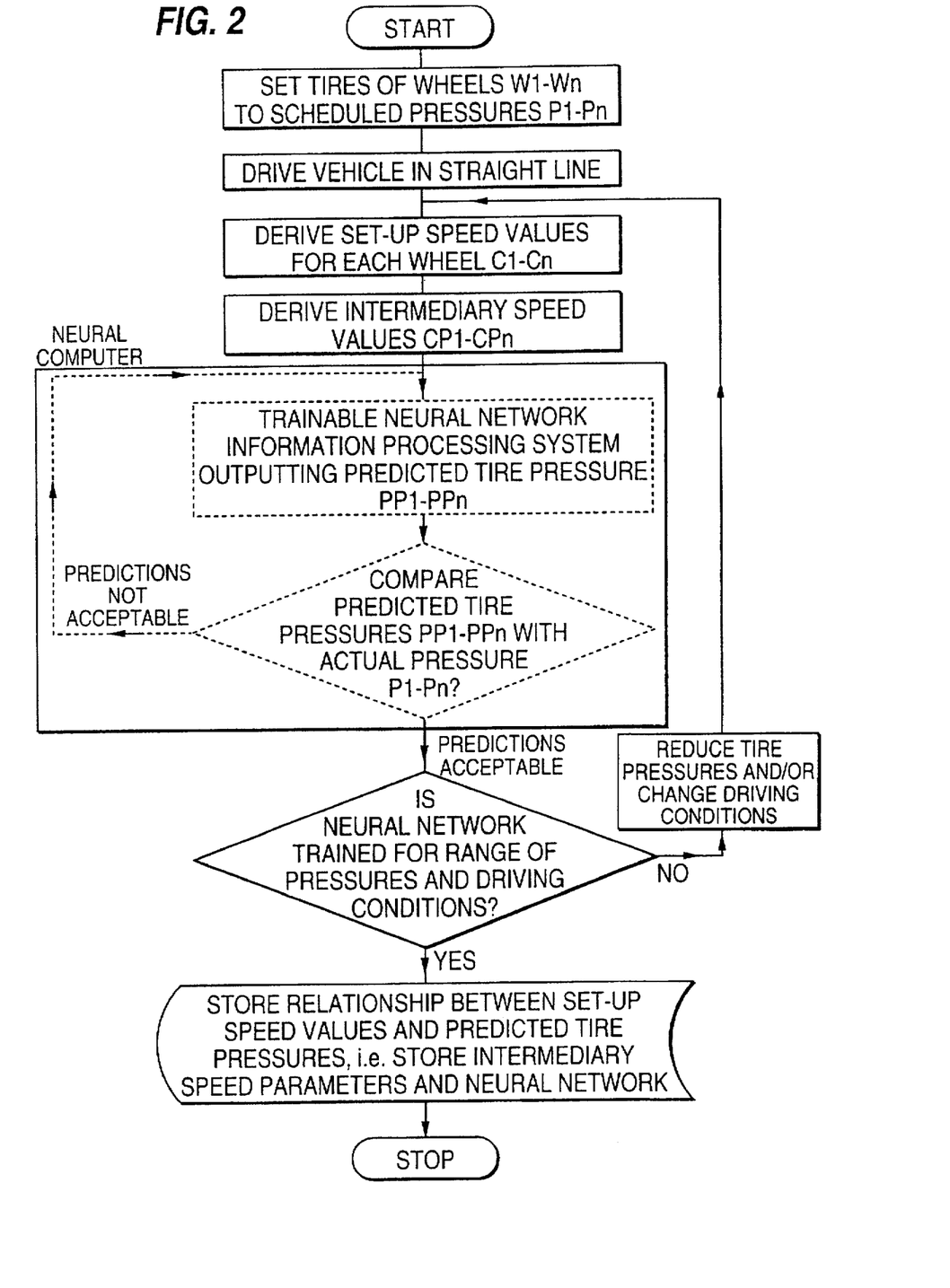
FIG. 2 illustrates a step-flow diagram of the set-up procedure included in the inventive method.

In a set up procedure, the car was driven through a complete range of normal speeds and driving conditions such as straight ahead driving, cornering left and right, accelerating and braking. This was done with all four tires at their scheduled inflation pressure of 2.4 bar and repeated with each of the four tires in turn reduced in decrements of 0.2 bar down to an inflation pressure of 1.6 bar while the other three were maintained at the scheduled pressure. Accordingly after completion of the set up procedure the storage means had stored in grouped data for each 5-second period the instant wheel signal pulse counts C1–C4 of each wheel W1–W4 and the instant inflation pressure of each tire on wheels W1–W4.

Figure 3:
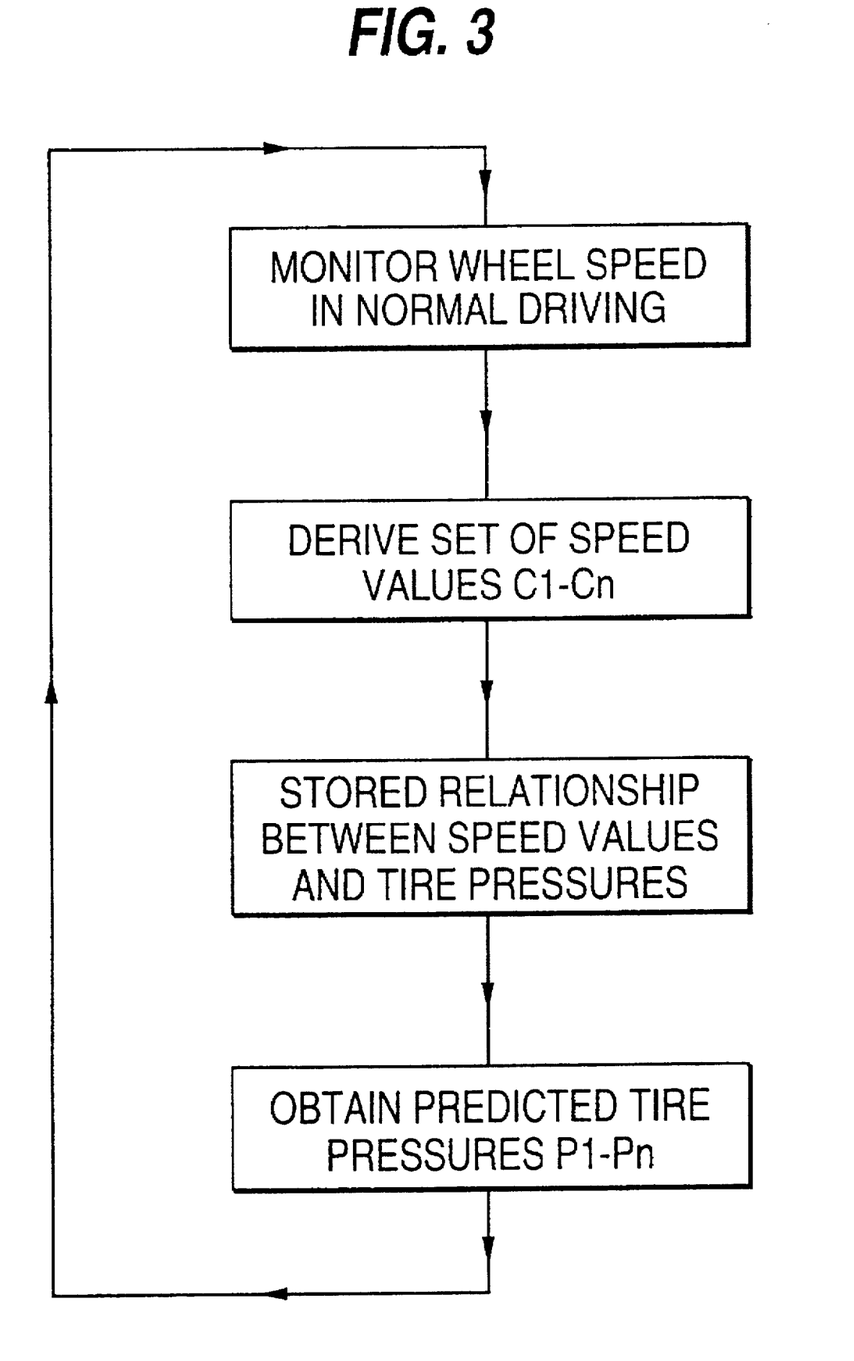
FIG. 3 illustrates a step-flow diagram of the subsequent normal driving stage in the inventive method.

Subsequently, in normal drawing, the four wheel speed signal pulse counts C1–C4 in each consecutive 5-second period were again monitored and compared by electronic means with the stored signal pulse counts from the set up procedure. When there was found a matching set of stored pulse counts in which each wheel count corresponded to the monitored wheel count of the same wheel, then in the event that one of the stored tire inflation pressures in that data group was a pressure of less than the schedule inflation pressure of 2.4 bar, then an alarm was activated to warn the driver of the car that a deflated tire had been detected.

In a second, and preferred, embodiment of the present invention the stored wheel signal pulse count data was used to calculate eight intermediary set up speed parameters CP1–CP8 defined as follows:

CP1=Average speed parameter A=(C1+C2+C3+C4)/4

CP2=1–(C1/A)

CP3=1–(C2/A)

CP4=1–(C3/A)

CP5=1–(C4/A)

CP6=((C1+C2)–(C3+C4))/A

CP7=((C1+C3)–(C2+C4))/A

CP8=((C1+C4)–(C2+C3))/A

It can be seen from the above definitions that CP1 is a parameter which is directly related to the average speed of the vehicle whereas CP2–CP5 are parameters which are related also to the individual wheel speeds. Parameters CP6–CP8 are related to the differences in respectively front and rear wheels, left side and right side wheels and diagonally opposed pairs of wheels.

These eight intermediary set-up speed parameters were used to train a trainable information processing system to map the speed values to the inflation pressures of the four tires.

The trainable information processing system used was a neural network of the type known in the art as a Multi-Layer Perceptron Network. The Perceptron Network had an input layer comprising eight neurodes, each corresponding to one of the eight set up speed parameters, two hidden layers of neurodes and an output layer of four neurodes mapping to the four inflation pressures of the tires. The two hidden layers of neurodes had respectively 5 and 4 neurodes each. In each of the neurodes of the neural network the transfer function used to translate the input stimulus into the output response signal was one of the well-known Sigmoid function type based on a hyperbolic tangent function Tanh.

The Multi-Layer Perceptron Network used was one of the many commercially available neural network systems which are commonly supplied with training routines enabling the network to learn specific information processing tasks. Using such a training routine the Multi-Layer Perceptron Network was trained to predict the four tire pressures at the output layer in response to the eight set up speed parameters CP1–CP8 applied to the input layer. This training was carried out using half of the stored data relating to one deflated tire from the set up procedure selected randomly.

After completion of training, the reliability of the neural network in predicting tire pressures was assessed using the whole of the stored data relating to one deflated tire. Part of this reliability assessment is presented in Table 1. Shown in Table 1 are the calculated speed parameters CP1–CP8, the actual inflation pressure of the tire and the predicted tire pressure obtained by applying these speed parameters to the trained network. Table 1 shows the results for 216 data sets of which 50% (i.e. 108) relate to a tire having a reduced inflation pressure of 1.6 bar while the remainder relate to a normally inflated tire at a pressure of 2.4 bar. The reliability of the trained neural network to distinguish between the normally inflated tire and the underinflated tire is illustrated in Table 2 which shows the separation matrix of predicted tire pressures. For the purpose of ranking in Table 2, the predicted tire pressures of Table 1 have been rounded up to the nearest 0.1 bar. Thus, it can be seen from Table 2 that from, the 108 sets of data from underinflated tires the network predicted that 102 data sets related to tires at 1.6–1.8 bar, 5 sets related to tires at 1.8–1.9 bar and one set related to a tire at 1.9–2.1 bar. Similarly for the 108 sets of data from normally inflated tires, the network predicted that 99 sets related to tires at above 2.2 bar, 2 sets related to tires at 2.1–2.2 bar, 4 sets related to tires at 1.9–2.1 bar and 3 sets related to tires at 1.8–1.9 bar. Thus the total number of correct predictions was 201 out of 216. However, the ability of the trained neural network to distinguish between the two groups of data by the selection of appropriate prediction bands is clearly demonstrated.

Subsequently, the trained neural network was implemented in the method of the invention predicting the tire pressure from the corresponding eight normal driving parameters derived from the four wheel speed signal pulse counts C1–C4 monitored in normal driving. The tire pressures of the wheels were then displayed on a digital readout.

In another embodiment, the predicted tire pressures were compared with the scheduled tire pressures for the vehicle and in the event that a tire was found to be deflated, then an alarm was operated to warn the driver that a tire was deflated.

By extracting the network weights for the neurodes of the trained network, the trained information processing system may be implemented on an untrainable network using conventional computer techniques in a vehicle-based microcomputer or equivalent processing device.

While the method of the invention has been illustrated by the use of a Multi-Layer Perceptron Network, other types of neural network information processing system may be employed. These include, for example, the well known KOHONEN networks, radial basis function networks or indeed any network which permits the mapping of a set of parameters onto a set of states.

Also, it should be understood that the training regime described may be changed, for example by using a full range of pressures for each of the tires.

Furthermore, the above embodiments use a single training or learning process. It is also feasible to retrain either occasionally or each time the vehicle is driven although in the latter case precautions need to be taken to avoid calibrating out pressure errors.

Also while the above-described embodiment utilizes the eight parameters CP1–8 both in training the neural network and, subsequently, in applying the trained network to the monitoring of the tires in normal driving, it is possible to use the actual wheel speed signal counts in this regard. It has been found, however, that the use of the above-described parameters derived from the wheel speed signal counts greatly reduces the network training time and increases the accuracy of the predicted tire pressures.

The method of the invention can be applied to any vehicle having two or more wheels including motorcycles, motor cars and multi-axled trucks having more than four wheels.

In other embodiments, additional signals to the wheel speed values may be monitored. These include, for example, steering wheel position, shock absorber pressure, spring length or deflection or the operative status of the anti-lock braking system. In the case of a two wheeled motorcycle, monitoring of the suspension deflections is a particularly effective "speed" value to be monitored in addition to the speed value for each of the wheels.

The use of such additional signals as additional inputs to a neural information processing system can assist in minimizing the training time and maximizing the accuracy of the trained network in the application of the method to different types of vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

| | Parameters | | | | | | | | Tyre pressure (Bar) | |
|---|---|---|---|---|---|---|---|---|---|---|
| Data set | CP2 | CP3 | CP4 | CP5 | CP1 × 10$^{-4}$ | CP6 | CP7 | CP8 | Actual | Predicted |
| 1 | −0.00218 | −0.00218 | 0.00238 | 0.00198 | 0.74628 | 0.00871 | −0.0004 | 0.0004 | 2.4 | 2.4072 |
| 2 | 0.00166 | 0.00118 | −0.00118 | −0.00166 | 0.21135 | −0.00568 | −0.00095 | 0.0 | 2.4 | 2.4075 |
| 3 | −0.00213 | −0.00226 | 0.0022 | 0.0022 | 0.71747 | 0.00878 | −0.00014 | −0.00014 | 2.4 | 2.40736 |
| 4 | −0.00524 | −0.00071 | 0.0033 | 0.00265 | 0.77315 | 0.0119 | 0.00388 | 0.00517 | 1.6 | 1.59531 |
| 5 | −0.00594 | −0.00228 | 0.00359 | 0.00463 | 0.76645 | 0.01644 | 0.0047 | 0.00261 | 11.6 | 1.60326 |
| 6 | −0.00532 | −0.00142 | 0.00316 | 0.00358 | 0.71957 | 0.01348 | 0.00431 | 0.00347 | 1.6 | 1.59564 |
| 7 | −0.01385 | 0.00727 | −0.00891 | 0.01549 | 0.36475 | 0.01316 | 0.04551 | −0.00329 | 2.4 | 2.35536 |
| 8 | −0.00555 | −0.00154 | 0.00278 | 0.00432 | 0.6482 | 0.01419 | 0.00555 | 0.00247 | 1.6 | 1.58489 |
| 9 | −0.0053 | −0.00222 | 0.00344 | 0.00408 | 0.77767 | 0.01504 | 0.00373 | 0.00244 | 1.6 | 1.61351 |
| 10 | −0.00373 | −0.00261 | 0.00218 | 0.00415 | 0.71015 | 0.01267 | 0.0031 | −0.00084 | 2.4 | 2.40467 |
| 11 | −0.00365 | −0.00319 | 0.0028 | 0.00403 | 0.65143 | 0.01366 | 0.00169 | −0.00077 | 2.4 | 2.39358 |
| 12 | −0.0027 | −0.00168 | 0.00197 | 0.00241 | 0.68525 | 0.00876 | 0.00146 | 0.00058 | 2.4 | 2.4066 |
| 13 | −0.00538 | −0.00099 | 0.00284 | 0.00353 | 0.72938 | 0.01275 | 0.00507 | 0.0037 | 1.6 | 1.59541 |
| 14 | −0.00532 | −0.00166 | 0.00316 | 0.00383 | 0.6011 | 0.01397 | 0.00433 | 0.00299 | 1.6 | 1.59659 |
| 15 | −0.00217 | −0.00217 | 0.00275 | 0.00159 | 0.6913 | 0.00868 | −0.00116 | 0.00116 | 2.4 | 2.40108 |
| 16 | −0.0036 | −0.00277 | 0.00291 | 0.00346 | 0.7227 | 0.01273 | 0.00138 | 0.00028 | 2.4 | 2.40429 |
| 17 | −0.01484 | 0.01105 | −0.00947 | 0.01326 | 0.3168 | 0.00758 | 0.04861 | 0.00316 | 1.6 | 1.61286 |
| 18 | −0.00286 | −0.00233 | 0.00233 | 0.00286 | 0.75095 | 0.01039 | 0.00107 | −0.0 | 2.4 | 2.40714 |
| 19 | −0.00215 | −0.00215 | 0.00268 | 0.00162 | 0.66298 | 0.0086 | −0.00106 | 0.00106 | 2.4 | 2.40324 |
| 20 | −0.00395 | −0.00286 | 0.00317 | 0.00364 | 0.64575 | 0.01363 | 0.00155 | 0.00062 | 2.4 | 2.38861 |
| 21 | −0.00552 | −0.00169 | 0.00322 | 0.00399 | 0.652 | 0.01442 | 0.0046 | 0.00307 | 1.6 | 1.59728 |
| 22 | −0.00468 | −0.00101 | 0.0033 | 0.00239 | 0.76412 | 0.01139 | 0.00275 | 0.00458 | 1.6 | 1.5953 |
| 23 | −0.00277 | −0.0021 | 0.00203 | 0.00283 | 0.75002 | 0.00973 | 0.00147 | −0.00013 | 2.4 | 2.4073 |
| 24 | −0.00526 | −0.00108 | 0.00283 | 0.00351 | 0.741 | 0.01269 | 0.00486 | 0.00351 | 1.6 | 1.59539 |
| 25 | −0.00211 | −0.00195 | 0.00226 | 0.00179 | 0.64125 | 0.00811 | −0.00031 | 0.00062 | 2.4 | 2.40671 |
| 26 | −0.00274 | −0.00631 | 0.00911 | −0.00006 | 0.44747 | 0.0181 | −0.01274 | 0.00559 | 1.6 | 1.81492 |
| 27 | −0.0144 | 0.00643 | −0.00617 | 0.01414 | 0.389 | 0.01594 | 0.04113 | 0.00051 | 1.6 | 1.66101 |
| 28 | −0.00253 | −0.00212 | 0.00219 | 0.00247 | 0.72008 | 0.0093 | 0.00069 | 0.00014 | 2.4 | 2.40723 |
| 29 | −0.0025 | −0.00154 | 0.00188 | 0.00216 | 0.72988 | 0.00808 | 0.00123 | 0.00068 | 2.4 | 2.40658 |
| 30 | −0.00519 | −0.00109 | 0.00229 | 0.00399 | 0.70872 | 0.01256 | 0.00578 | 0.0024 | 1.6 | 1.6068 |
| 31 | −0.0177 | 0.01237 | −0.01317 | 0.01851 | 0.30933 | 0.01067 | 0.06175 | −0.00162 | 2.4 | 2.35911 |
| 32 | −0.00374 | −0.00302 | 0.00302 | 0.00374 | 0.6944 | 0.01354 | 0.00144 | 0.0 | 2.4 | 2.4 |
| 33 | −0.00203 | −0.00216 | 0.00257 | 0.00162 | 0.7401 | 0.00838 | −0.00108 | 0.00081 | 2.4 | 2.40625 |
| 34 | −0.00494 | −0.00088 | 0.00291 | 0.00291 | 0.76452 | 0.01164 | 0.00405 | 0.00405 | 1.6 | 1.59531 |
| 35 | −0.00594 | −0.00181 | 0.00297 | 0.00478 | 0.774 | 0.0155 | 0.00594 | 0.00233 | 1.6 | 1.60871 |
| 36 | −0.00564 | −0.00118 | 0.00341 | 0.00341 | 0.74032 | 0.01364 | 0.00446 | 0.00446 | 1.6 | 1.59557 |
| 37 | −0.00637 | −0.00044 | 0.00133 | 0.00548 | 0.33755 | 0.01363 | 0.01007 | 0.00178 | 1.6 | 1.5501 |
| 38 | −0.0032 | −0.00195 | 0.00167 | 0.00348 | 0.7191 | 0.01029 | 0.00306 | −0.00056 | 2.4 | 2.40712 |
| 39 | −0.00803 | −0.00836 | 0.00869 | 0.0077 | 0.30505 | 0.03278 | −0.00131 | 0.00066 | 2.4 | 2.36321 |
| 40 | −0.00327 | −0.0022 | 0.00207 | 0.00341 | 0.74885 | 0.01095 | 0.0024 | −0.00027 | 2.4 | 2.40703 |
| 41 | −0.00546 | −0.00223 | 0.00359 | 0.0041 | 0.77347 | 0.01539 | 0.00375 | 0.00272 | 1.6 | 11.60099 |
| 42 | −0.00626 | −0.00274 | 0.0043 | 0.00471 | 0.73857 | 0.01801 | 0.00393 | 0.00311 | 1.6 | 1.64373 |
| 43 | −0.00289 | −0.00233 | 0.00198 | 0.00324 | 0.71812 | 0.01044 | 0.00181 | −0.0007 | 2.4 | 2.40705 |

TABLE 1-continued

| | Parameters | | | | | | | | Tyre pressure (Bar) | |
|---|---|---|---|---|---|---|---|---|---|---|
| Data set | CP2 | CP3 | CP4 | CP5 | CP1 × 10$^{-4}$ | CP6 | CP7 | CP8 | Actual | Predicted |
| 44 | −0.00514 | −0.00092 | 0.0029 | 0.00317 | 0.73392 | 0.01213 | 0.0045 | 0.00395 | 1.6 | 1.59535 |
| 45 | −0.00519 | −0.00148 | 0.00292 | 0.00374 | 0.72793 | 0.01333 | 0.00453 | 0.00288 | 1.6 | 1.59572 |
| 46 | −0.00293 | −0.00266 | 0.00279 | 0.00279 | 0.73445 | 0.01116 | 0.00027 | 0.00027 | 2.4 | 2.40653 |
| 47 | −0.00416 | 0.00059 | 0.00161 | 0.00195 | 0.58935 | 0.00713 | 0.00509 | 0.00441 | 1.6 | 1.59516 |
| 48 | −0.00276 | −0.0018 | 0.00201 | 0.00255 | 0.73448 | 0.00912 | 0.0015 | 0.00041 | 2.4 | 2.40704 |
| 49 | −0.0062 | −0.002 | 0.00347 | 0.00474 | 0.78602 | 0.01641 | 0.00547 | 0.00293 | 1.6 | 1.59859 |
| 50 | −0.00505 | −0.00154 | 0.00351 | 0.00309 | 0.7125 | 0.01319 | 0.00309 | 0.00393 | 1.6 | 1.5956 |
| 51 | −0.00331 | −0.00249 | 0.00249 | 0.00331 | 0.7241 | 0.0116 | 0.00166 | 0.0 | 2.4 | 2.40633 |
| 52 | −0.00323 | −0.00282 | 0.00282 | 0.00323 | 0.72705 | 0.0121 | 0.00083 | −0.0 | 2.4 | 2.4058 |
| 53 | −0.00583 | −0.00222 | 0.00384 | 0.00422 | 0.77567 | 0.01612 | 0.004 | 0.00322 | 1.6 | 1.59785 |
| 54 | −0.00336 | −0.0025 | 0.0025 | 0.00336 | 0.58075 | 0.01171 | 0.00172 | 0.0 | 2.4 | 2.40008 |
| 55 | −0.00216 | −0.00268 | 0.003 | 0.00184 | 0.77382 | 0.00969 | −0.00168 | 0.00065 | 2.4 | 2.40655 |
| 56 | −0.00595 | −0.00109 | 0.00273 | 0.00431 | 0.76007 | 0.01408 | 0.00645 | 0.00329 | 1.6 | 1.59561 |
| 57 | −0.00519 | −0.00171 | 0.00323 | 0.00367 | 0.68862 | 0.0138 | 0.00392 | 0.00305 | 1.6 | 1.59581 |
| 58 | −0.00247 | −0.00218 | 0.00225 | 0.0024 | 0.69858 | 0.0093 | 0.00043 | 0.00014 | 2.4 | 2.40716 |
| 59 | −0.0188 | 0.016 | −0.01569 | 0.01849 | 0.32185 | 0.00559 | 0.06898 | 0.00062 | 2.4 | 2.34942 |
| 60 | −0.00352 | 0.0006 | 0.00168 | 0.00124 | 0.46198 | 0.00584 | 0.00368 | 0.00455 | 1.6 | 1.59503 |
| 61 | 0.00041 | −0.00921 | 0.01167 | −0.00287 | 0.42628 | 0.01759 | −0.02416 | 0.00493 | 2.4 | 1.84184 |
| 62 | −0.00367 | 0.00037 | 0.00202 | 0.00128 | 0.5457 | 0.0066 | 0.0033 | 0.00476 | 1.6 | 1.59524 |
| 63 | −0.00237 | −0.00156 | 0.00101 | 0.00291 | 0.73935 | 0.00784 | 0.00271 | −0.00108 | 2.4 | 2.40747 |
| 64 | −0.00534 | −0.0009 | 0.00284 | 0.0034 | 0.72115 | 0.01248 | 0.00499 | 0.00388 | 1.6 | 1.59539 |
| 65 | −0.00569 | 0.00045 | −0.00083 | 0.00608 | 0.39077 | 0.01049 | 0.01305 | −0.00077 | 2.4 | 2.38828 |
| 66 | −0.00217 | −0.00244 | 0.0027 | 0.00191 | 0.75955 | 0.00922 | −0.00105 | 0.00053 | 2.4 | 2.40697 |
| 67 | −0.00197 | −0.00149 | 0.00157 | 0.00189 | 0.62058 | 0.00693 | 0.00081 | 0.00016 | 2.4 | 2.40734 |
| 68 | −0.00326 | 0.00133 | 0.00181 | 0.00012 | 0.41435 | 0.00386 | 0.0029 | 0.00627 | 1.6 | 1.59527 |
| 69 | −0.00574 | −0.00169 | 0.00311 | 0.00432 | 0.66618 | 0.01486 | 0.00525 | 0.00285 | 1.6 | 1.59712 |
| 70 | −0.0031 | −0.00229 | 0.0027 | 0.0027 | 0.7416 | 0.01079 | 0.00081 | 0.00081 | 2.4 | 2.40397 |
| 71 | −0.01319 | 0.00651 | −0.00588 | 0.01255 | 0.31475 | 0.01334 | 0.03813 | 0.00127 | 1.6 | 1.66586 |
| 72 | −0.00305 | −0.00265 | 0.00271 | 0.00298 | 0.74603 | 0.01139 | 0.00067 | 0.00013 | 2.4 | 2.40663 |
| 73 | −0.01434 | −0.00797 | 0.01009 | 0.01221 | 0.09415 | 0.04461 | 0.0085 | 0.00425 | 1.6 | 1.91036 |
| 74 | −0.0045 | −0.00039 | 0.00244 | 0.00244 | 0.70603 | 0.00977 | 0.00411 | 0.00411 | 1.6 | 1.59524 |
| 75 | −0.0052 | −0.00206 | 0.00448 | 0.00278 | 0.76452 | 0.01452 | 0.00144 | 0.00484 | 1.6 | 1.59582 |
| 76 | −0.00299 | 0.00136 | 0.00081 | 0.00081 | 0.18415 | 0.00326 | 0.00434 | 0.00434 | 1.6 | 1.58529 |
| 77 | −0.01358 | 0.00916 | −0.01037 | 0.01478 | 0.37383 | 0.00883 | 0.04788 | −0.00241 | 2.4 | 2.40608 |
| 78 | −0.00495 | −0.00118 | 0.00286 | 0.00327 | 0.71775 | 0.01226 | 0.00418 | 0.00334 | 1.6 | 1.59525 |
| 79 | −0.00332 | −0.00251 | 0.00264 | 0.00318 | 0.73805 | 0.01165 | 0.00135 | 0.00027 | 2.4 | 2.4062 |
| 80 | −0.00269 | −0.00228 | 0.00235 | 0.00262 | 0.73403 | 0.00995 | 0.00068 | 0.00014 | 2.4 | 2.40713 |
| 81 | −0.00367 | −0.0023 | 0.00251 | 0.00347 | 0.72822 | 0.01195 | 0.00233 | 0.00041 | 2.4 | 2.40535 |
| 82 | −0.01638 | 0.00648 | −0.00662 | 0.01652 | 0.35873 | 0.01979 | 0.046 | −0.00028 | 1.6 | 1.56446 |
| 83 | −0.00551 | −0.00179 | 0.00325 | 0.00405 | 0.75365 | 0.0146 | 0.00451 | 0.00292 | 1.6 | 1.59703 |
| 84 | −0.00285 | 0.00159 | 0.00095 | 0.00032 | 0.47305 | 0.00254 | 0.00381 | 0.00507 | 1.6 | 1.59517 |
| 85 | −0.01609 | 0.00795 | −0.00835 | 0.01649 | 0.37437 | 0.01629 | 0.04888 | −0.0008 | 1.6 | 1.62283 |
| 86 | −0.00555 | −0.00222 | 0.00319 | 0.00458 | 0.7213 | 0.01553 | 0.00471 | 0.00194 | 1.6 | 1.62654 |
| 87 | −0.00686 | 0.00333 | −0.00318 | 0.00672 | 0.35337 | 0.00707 | 0.02009 | 0.00028 | 2.4 | 2.39106 |
| 88 | −0.00185 | −0.00118 | 0.00118 | 0.00185 | 0.5935 | 0.00607 | 0.00135 | 0.0 | 2.4 | 2.4074 |
| 89 | −0.00237 | −0.00251 | 0.00244 | 0.00244 | 0.68607 | 0.00977 | −0.00015 | −0.00015 | 2.4 | 2.40704 |
| 90 | −0.00205 | −0.00262 | 0.00262 | 0.00205 | 0.70565 | 0.00935 | −0.00113 | 0.0 | 2.4 | 2.40721 |
| 91 | −0.00527 | −0.00114 | 0.00328 | 0.00313 | 0.67792 | 0.01283 | 0.00398 | 0.00428 | 1.6 | 1.59563 |
| 92 | −0.00539 | −0.00154 | 0.00346 | 0.00346 | 0.7797 | 0.01385 | 0.00385 | 0.00385 | 1.6 | 1.59552 |
| 93 | −0.01067 | −0.00325 | 0.0038 | 0.01011 | 0.26943 | 0.02784 | 0.01373 | 0.00111 | 1.6 | 1.45905 |
| 94 | −0.00294 | −0.00266 | 0.00259 | 0.00301 | 0.72258 | 0.01121 | 0.00069 | −0.00014 | 2.4 | 2.40663 |
| 95 | −0.003 | −0.0023 | 0.00244 | 0.00286 | 0.71595 | 0.01062 | 0.00112 | 0.00028 | 2.4 | 2.40668 |
| 96 | −0.0021 | −0.00167 | 0.00174 | 0.00203 | 0.70323 | 0.00754 | 0.00071 | 0.00014 | 2.4 | 2.40739 |
| 97 | −0.00311 | −0.00296 | 0.00288 | 0.00318 | 0.66822 | 0.01212 | 0.00045 | −0.00015 | 2.4 | 2.40396 |
| 98 | −0.00542 | −0.00183 | 0.0037 | 0.00355 | 0.66938 | 0.01449 | 0.00344 | 0.00373 | 1.6 | 1.59772 |
| 99 | −0.00607 | −0.00163 | 0.00294 | 0.00476 | 0.76605 | 0.0154 | 0.00627 | 0.00261 | 1.6 | 1.59853 |
| 100 | −0.00207 | −0.00194 | 0.00259 | 0.00142 | 0.7724 | 0.00803 | −0.00104 | 0.00129 | 2.4 | 2.39795 |
| 101 | −0.0034 | −0.00233 | 0.0026 | 0.00313 | 0.75065 | 0.01146 | 0.0016 | 0.00053 | 2.4 | 2.40565 |
| 102 | −0.00661 | −0.00661 | 0.00733 | 0.0059 | 0.27985 | 0.02644 | −0.00143 | 0.00143 | 1.6 | 1.70628 |
| 103 | −0.00593 | −0.00198 | 0.00309 | 0.00483 | 0.63195 | 0.01582 | 0.0057 | 0.00222 | 1.6 | 1.58022 |
| 104 | −0.00572 | −0.00302 | 0.00473 | 0.00401 | 0.55532 | 0.01747 | 0.00198 | 0.00342 | 1.6 | 1.70957 |
| 105 | −0.00757 | −0.00451 | 0.00349 | 0.00859 | 0.6872 | 0.02416 | 0.00815 | −0.00204 | 1.6 | 1.65662 |
| 106 | −0.00393 | 0.00011 | 0.00184 | 0.00198 | 0.69318 | 0.00765 | 0.00418 | 0.0039 | 1.6 | 1.59484 |
| 107 | −0.00299 | −0.00257 | 0.00257 | 0.00299 | 0.71845 | 0.01114 | 0.00083 | −0.0 | 2.4 | 2.4066 |
| 108 | −0.00587 | −0.00252 | 0.00463 | 0.00375 | 0.68587 | 0.01677 | 0.00248 | 0.00423 | 1.6 | 1.62754 |
| 109 | −0.00642 | −0.00239 | 0.00349 | 0.00532 | 0.5448 | 0.01762 | 0.00587 | 0.0022 | 1.6 | 1.69516 |
| 110 | −0.01415 | 0.00805 | −0.00696 | 0.01305 | 0.31988 | 0.01219 | 0.0422 | 0.00219 | 1.6 | 1.69002 |
| 111 | −0.00504 | −0.00483 | 0.00524 | 0.00463 | 0.48645 | 0.01973 | −0.00041 | 0.00082 | 2.4 | 2.61306 |
| 112 | −0.00526 | −0.00134 | 0.00336 | 0.00323 | 0.76538 | 0.0132 | 0.00379 | 0.00405 | 1.6 | 1.59543 |
| 113 | 0.00545 | −0.00475 | 0.00545 | −0.00615 | 0.28435 | −0.00141 | −0.0218 | 0.00141 | 2.4 | 2.40739 |
| 114 | −0.00133 | −0.00078 | 0.00051 | 0.00161 | 0.54317 | 0.00423 | 0.00166 | −0.00055 | 2.4 | 2.40748 |
| 115 | −0.00528 | −0.00129 | 0.00322 | 0.00335 | 0.75332 | 0.01314 | 0.00412 | 0.00385 | 1.6 | 1.59545 |
| 116 | 0.00117 | −0.00011 | 0.00053 | −0.00159 | 0.47205 | −0.00212 | −0.00339 | 0.00085 | 2.4 | 2.40736 |
| 117 | −0.00283 | −0.00229 | 0.00256 | 0.00256 | 0.741 | 0.01026 | 0.00054 | 0.00054 | 2.4 | 2.40646 |

TABLE 1-continued

| | Parameters | | | | | | | | Tyre pressure (Bar) | |
|---|---|---|---|---|---|---|---|---|---|---|
| Data set | CP2 | CP3 | CP4 | CP5 | CP1 × 10⁻⁴ | CP6 | CP7 | CP8 | Actual | Predicted |
| 118 | −0.00342 | −0.00272 | 0.00286 | 0.00328 | 0.71695 | 0.01227 | 0.00112 | 0.00028 | 2.4 | 2.40502 |
| 119 | −0.00301 | −0.00245 | 0.00273 | 0.00273 | 0.71485 | 0.01091 | 0.00056 | 0.00056 | 2.4 | 2.40579 |
| 120 | −0.01208 | 0.00646 | −0.00759 | 0.01321 | 0.3559 | 0.01124 | 0.03934 | −0.00225 | 2.4 | 2.3903 |
| 121 | −0.00237 | −0.00237 | 0.00335 | 0.0014 | 0.76938 | 0.00949 | −0.00195 | 0.00195 | 2.4 | 2.03896 |
| 122 | −0.00163 | −0.00092 | 0.00101 | 0.00154 | 0.56918 | 0.0051 | 0.00123 | 0.00018 | 2.4 | 2.4074 |
| 123 | −0.00239 | −0.00195 | 0.00202 | 0.00231 | 0.68088 | 0.00867 | 0.00073 | 0.00015 | 2.4 | 2.40723 |
| 124 | −0.00826 | 0.00275 | 0.00275 | 0.00275 | 0.01815 | 0.01102 | 0.01102 | 0.01102 | 1.6 | 1.7017 |
| 125 | −0.00254 | −0.00241 | 0.00247 | 0.00247 | 0.73752 | 0.0099 | 0.00014 | 0.00014 | 2.4 | 2.40716 |
| 126 | −0.0031 | −0.00714 | 0.00904 | 0.0012 | 0.39548 | 0.02048 | −0.01188 | 0.00379 | 1.6 | 1.90229 |
| 127 | −0.00942 | 0.00371 | −0.002 | 0.00771 | 0.3504 | 0.01142 | 0.02283 | 0.00342 | 1.6 | 1.58971 |
| 128 | −0.0054 | −0.00229 | 0.00378 | 0.00392 | 0.70858 | 0.01538 | 0.00325 | 0.00296 | 1.6 | 1.59945 |
| 129 | −0.02207 | 0.0151 | −0.01477 | 0.02174 | 0.30135 | 0.01394 | 0.07367 | 0.00066 | 1.6 | 1.71327 |
| 130 | −0.00593 | −0.00196 | 0.0033 | 0.00459 | 0.77928 | 0.01578 | 0.00526 | 0.00269 | 1.6 | 1.59964 |
| 131 | −0.00558 | −0.00214 | 0.0036 | 0.00411 | 0.78452 | 0.01542 | 0.00395 | 0.00293 | 1.6 | 1.59801 |
| 132 | −0.00571 | −0.00254 | 0.00366 | 0.00459 | 0.75738 | 0.0165 | 0.00409 | 0.00224 | 1.6 | 1.62281 |
| 133 | −0.01614 | 0.00869 | −0.0083 | 0.01575 | 0.38252 | 0.0149 | 0.04889 | 0.00078 | 1.6 | 1.67725 |
| 134 | −0.01289 | 0.00604 | −0.00768 | 0.01454 | 0.3645 | 0.01372 | 0.04115 | −0.00329 | 2.4 | 2.3135 |
| 135 | −0.00338 | −0.00268 | 0.00317 | 0.00289 | 0.71697 | 0.01213 | 0.00042 | 0.00098 | 2.4 | 2.39486 |
| 136 | −0.00515 | −0.00195 | 0.00393 | 0.00317 | 0.78167 | 0.0142 | 0.00243 | 0.00397 | 1.6 | 1.59561 |
| 137 | −0.00501 | −0.00347 | 0.00366 | 0.00481 | 0.5193 | 0.01695 | 0.0027 | 0.00039 | 2.4 | 1.89939 |
| 138 | −0.00264 | −0.0022 | 0.00213 | 0.00271 | 0.69217 | 0.00968 | 0.00101 | −0.00014 | 2.4 | 2.40712 |
| 139 | −0.00564 | −0.00141 | 0.00313 | 0.00392 | 0.638 | 0.01411 | 0.00502 | 0.00345 | 1.6 | 1.59759 |
| 140 | −0.00365 | −0.00267 | 0.00253 | 0.00379 | 0.7117 | 0.01265 | 0.00225 | −0.00028 | 2.4 | 2.40466 |
| 141 | −0.00265 | −0.00222 | 0.00215 | 0.00272 | 0.70812 | 0.00974 | 0.00099 | −0.00014 | 2.4 | 2.40717 |
| 142 | −0.00595 | −0.00155 | 0.00375 | 0.00375 | 0.65938 | 0.01501 | 0.0044 | 0.0044 | 1.6 | 1.60043 |
| 143 | −0.00524 | −0.00175 | 0.00376 | 0.00323 | 0.7438 | 0.01398 | 0.00296 | 0.00403 | 1.6 | 1.59571 |
| 144 | −0.00572 | −0.00175 | 0.00343 | 0.00404 | 0.65535 | 0.01495 | 0.00458 | 0.00336 | 1.6 | 1.60032 |
| 145 | −0.00495 | −0.00368 | 0.00359 | 0.00504 | 0.55077 | 0.01725 | 0.00272 | −0.00018 | 2.4 | 1.98251 |
| 146 | −0.0057 | −0.00172 | 0.00348 | 0.00394 | 0.65328 | 0.01485 | 0.00444 | 0.00352 | 1.6 | 1.6 |
| 147 | −0.00322 | −0.00266 | 0.00287 | 0.00301 | 0.70562 | 0.01176 | 0.00071 | 0.00043 | 2.4 | 2.4052 |
| 148 | −0.00237 | −0.00182 | 0.00176 | 0.00244 | 0.72637 | 0.0084 | 0.00124 | −0.00014 | 2.4 | 2.4074 |
| 149 | −0.00501 | −0.00156 | 0.00341 | 0.00316 | 0.78377 | 0.01314 | 0.00319 | 0.0037 | 1.6 | 1.59548 |
| 150 | −0.00229 | −0.00216 | 0.00268 | 0.00177 | 0.76485 | 0.00889 | −0.00078 | 0.00105 | 2.4 | 2.40326 |
| 151 | −0.00361 | −0.00236 | 0.00222 | 0.00375 | 0.7196 | 0.01195 | 0.00278 | −0.00028 | 2.4 | 2.40604 |
| 152 | −0.00516 | −0.00172 | 0.00371 | 0.00318 | 0.7551 | 0.01377 | 0.00291 | 0.00397 | 1.6 | 1.59559 |
| 153 | −0.00206 | −0.00769 | 0.00919 | 0.00056 | 0.26645 | 0.01952 | −0.01426 | 0.003 | 2.4 | 1.92892 |
| 154 | −0.00697 | −0.00628 | 0.00662 | 0.00662 | 0.43418 | 0.02649 | 0.00069 | 0.00069 | 1.6 | 1.59949 |
| 155 | −0.0039 | −0.00376 | 0.00172 | 0.00594 | 0.71102 | 0.01533 | 0.00436 | −0.00408 | 2.4 | 2.38517 |
| 156 | −0.00486 | −0.00203 | 0.00428 | 0.00261 | 0.77662 | 0.01378 | 0.00116 | 0.00451 | 1.6 | 1.59551 |
| 157 | −0.00246 | −0.00137 | 0.00137 | 0.00246 | 0.7312 | 0.00766 | 0.00219 | 0.0 | 2.4 | 2.40743 |
| 158 | −0.00662 | −0.00357 | 0.00251 | 0.00768 | 0.65755 | 0.02038 | 0.00821 | −0.00213 | 1.6 | 1.81548 |
| 159 | −0.00467 | 0.00008 | 0.00191 | 0.00268 | 0.65325 | 0.00918 | 0.00551 | 0.00398 | 1.6 | 1.59508 |
| 160 | −0.00762 | 0.00244 | −0.00274 | 0.00793 | 0.3279 | 0.01037 | 0.02074 | −0.00061 | 2.4 | 2.37942 |
| 161 | −0.00423 | −0.00035 | 0.00275 | 0.0182 | 0.64447 | 0.00915 | 0.00295 | 0.00481 | 1.6 | 1.59529 |
| 162 | −0.00224 | −0.00224 | 0.00285 | 0.00162 | 0.72688 | 0.00894 | −0.00124 | 0.00124 | 2.4 | 2.39784 |
| 163 | −0.00263 | −0.00192 | 0.00263 | 0.00192 | 0.70265 | 0.00911 | 0.0 | 0.00142 | 2.4 | 2.37766 |
| 164 | −0.00511 | −0.00102 | 0.0028 | 0.00334 | 0.73345 | 0.01227 | 0.00464 | 0.00354 | 1.6 | 1.59533 |
| 165 | −0.00184 | −0.00153 | 0.00168 | 0.00168 | 0.6531 | 0.00674 | 0.00031 | 0.00031 | 2.4 | 2.40734 |
| 166 | −0.00331 | −0.00277 | 0.00284 | 0.00324 | 0.74803 | 0.01217 | 0.00094 | 0.00013 | 2.4 | 2.40602 |
| 167 | −0.00355 | −0.0027 | 0.00305 | 0.00319 | 0.71207 | 0.0125 | 0.00098 | 0.0007 | 2.4 | 2.4015 |
| 168 | −0.00231 | −0.00145 | 0.00159 | 0.00217 | 0.6918 | 0.00752 | 0.00145 | 0.00029 | 2.4 | 2.40731 |
| 169 | −0.00492 | −0.0003 | 0.00287 | 0.00234 | 0.75718 | 0.01043 | 0.00409 | 0.00515 | 1.6 | 1.59528 |
| 170 | −0.00493 | −0.00061 | 0.0029 | 0.00263 | 0.74065 | 0.01107 | 0.00405 | 0.00459 | 1.6 | 1.5953 |
| 171 | −0.00611 | −0.00101 | 0.00239 | 0.00474 | 0.76452 | 0.01426 | 0.00746 | 0.00275 | 1.6 | 1.59538 |
| 172 | −0.00543 | −0.00125 | 0.0028 | 0.00388 | 0.74138 | 0.01335 | 0.00526 | 0.0031 | 1.6 | 1.59551 |
| 173 | 0.00005 | 0.00024 | 0.00005 | −0.00034 | 0.51772 | −0.00058 | −0.00019 | 0.00058 | 2.4 | 2.40741 |
| 174 | −0.0063 | −0.00149 | 0.00333 | 0.00446 | 0.62268 | 0.01558 | 0.00594 | 0.00369 | 1.6 | 1.61575 |
| 175 | −0.0053 | −0.00192 | 0.00346 | 0.00377 | 0.65045 | 0.01445 | 0.00369 | 0.00307 | 1.6 | 1.59793 |
| 176 | −0.00556 | −0.00165 | 0.00286 | 0.00436 | 0.665 | 0.01444 | 0.00541 | 0.00241 | 1.6 | 1.58819 |
| 177 | −0.00268 | −0.0024 | 0.00275 | 0.00233 | 0.71887 | 0.01015 | −0.00014 | 0.0007 | 2.4 | 2.40578 |
| 178 | −0.00449 | −0.00063 | 0.00273 | 0.00239 | 0.59553 | 0.01024 | 0.00353 | 0.0042 | 1.6 | 1.59533 |
| 179 | −0.00595 | −0.00176 | 0.00307 | 0.00271 | 1.00464 | 0.01542 | 0.00575 | 0.00261 | 1.6 | 1.59929 |
| 180 | 0.0068 | −0.01133 | 0.01335 | −0.00881 | 0.19855 | 0.00907 | −0.04029 | 0.00403 | 1.6 | 1.86686 |
| 181 | −0.00347 | −0.01645 | 0.01784 | 0.00208 | 0.10792 | 0.03984 | −0.02872 | 0.00278 | 2.4 | 1.92743 |
| 182 | −0.00223 | −0.0021 | 0.00176 | 0.00256 | 0.75103 | 0.00865 | 0.00093 | −0.00067 | 2.4 | 2.40743 |
| 183 | 0.00517 | −0.01177 | 0.01432 | −0.00771 | 0.29513 | 0.01321 | −0.03897 | 0.00508 | 1.6 | 1.74827 |
| 184 | −0.0052 | −0.00132 | 0.00284 | 0.00367 | 0.72145 | 0.01303 | 0.00471 | 0.00305 | 1.6 | 1.59525 |
| 185 | −0.00496 | −0.00102 | 0.00292 | 0.00306 | 0.6861 | 0.01195 | 0.00408 | 0.00379 | 1.6 | 1.59536 |
| 186 | −0.00584 | −0.00151 | 0.00282 | 0.00453 | 0.76145 | 0.01471 | 0.00604 | 0.00263 | 1.6 | 1.59786 |
| 187 | −0.00357 | −0.00163 | 0.00156 | 0.00364 | 0.72032 | 0.01041 | 0.00403 | −0.00014 | 2.4 | 2.40706 |
| 188 | −0.00479 | −0.00153 | 0.00381 | 0.00251 | 0.76753 | 0.01264 | 0.00195 | 0.00456 | 1.6 | 1.59537 |
| 189 | 0.00782 | −0.01208 | 0.01319 | −0.00892 | 0.31657 | 0.00853 | −0.04201 | 0.00221 | 2.4 | 2.17552 |
| 190 | −0.00142 | −0.0011 | 0.00167 | 0.00085 | 0.61553 | 0.00504 | −0.00049 | 0.00114 | 2.4 | 2.40456 |
| 191 | −0.0043 | −0.00333 | 0.00349 | 9.00414 | 0.61585 | 0.01526 | 0.00162 | 0.00032 | 2.4 | 2.33271 |

TABLE 1-continued

| | Parameters | | | | | | | | Tyre pressure (Bar) | |
|---|---|---|---|---|---|---|---|---|---|---|
| Data set | CP2 | CP3 | CP4 | CP5 | CP1 × 10⁻⁴ | CP6 | CP7 | CP8 | Actual | Predicted |
| 192 | −0.00599 | −0.00195 | 0.00312 | 0.00482 | 0.7681 | 0.01588 | 0.00573 | 0.00234 | 1.6 | 1.60746 |
| 193 | −0.00541 | −0.00148 | 0.00337 | 0.00352 | 0.66043 | 0.01378 | 0.00409 | 0.00379 | 1.6 | 1.5965 |
| 194 | −0.00504 | −0.0022 | 0.00413 | 0.0031 | 0.774 | 0.01447 | 0.00181 | 0.00388 | 1.6 | 1.59578 |
| 195 | −0.00462 | −0.00202 | 0.00384 | 0.0028 | 0.76815 | 0.01328 | 0.00156 | 0.00365 | 1.6 | 1.59563 |
| 196 | −0.0028 | −0.00238 | 0.00252 | 0.00266 | 0.7136 | 0.01037 | 0.00056 | 0.00028 | 2.4 | 2.40679 |
| 197 | −0.09524 | 0.04762 | −0.04762 | 0.09524 | 0.0147 | 0.09524 | 0.28571 | −0.0 | 2.4 | 1.91036 |
| 198 | −0.00535 | −0.00234 | 0.00385 | 0.00385 | 0.63052 | 0.01538 | 0.00301 | 0.00301 | 1.6 | 1.61124 |
| 199 | −0.0027 | −0.00256 | 0.0027 | 0.00256 | 0.7041 | 0.01051 | 0.0 | 0.00028 | 2.4 | 2.40665 |
| 200 | −0.0016 | −0.00469 | 0.00524 | 0.00105 | 0.45357 | 0.01257 | −0.00728 | 0.0011 | 2.4 | 2.23064 |
| 201 | −0.0051 | −0.00195 | 0.0036 | 0.00345 | 0.667 | 0.01409 | 0.003 | 0.0033 | 1.6 | 1.5969 |
| 202 | −0.0029 | −0.00152 | 0.00138 | 0.00304 | 0.7236 | 0.00884 | 0.00304 | −0.00028 | 2.4 | 2.40738 |
| 203 | −0.00525 | −0.00223 | 0.00352 | 0.00397 | 0.66142 | 0.01497 | 0.00348 | 0.00257 | 1.6 | 1.59768 |
| 204 | −0.00217 | −0.00164 | 0.00144 | 0.00237 | 0.74878 | 0.00761 | 0.00147 | −0.0004 | 2.4 | 2.40747 |
| 205 | −0.00599 | −0.00117 | 0.003 | 0.00417 | 0.7674 | 0.01433 | 0.00599 | 0.00365 | 1.6 | 1.59565 |
| 206 | −0.00276 | −0.00205 | 0.00233 | 0.00248 | 0.70675 | 0.00962 | 0.00085 | 0.00057 | 2.4 | 2.40648 |
| 207 | −0.00246 | −0.00193 | 0.00193 | 0.00246 | 0.75125 | 0.00879 | 0.00106 | −0.0 | 2.4 | 2.40738 |
| 208 | −0.00598 | −0.00259 | 0.00384 | 0.00473 | 0.55995 | 0.01714 | 0.00429 | 0.0025 | 1.6 | 1.7365 |
| 209 | −0.00594 | −0.00205 | 0.00354 | 0.00445 | 0.76982 | 0.01598 | 0.00481 | 0.00299 | 1.6 | 1.59811 |
| 210 | −0.00598 | −0.00457 | 0.00508 | 0.00548 | 0.49742 | 0.02111 | 0.00181 | 0.00101 | 1.6 | 2.00179 |
| 211 | −0.00351 | −0.00262 | 0.00314 | 0.00299 | 0.67743 | 0.01225 | 0.00074 | 0.00103 | 2.4 | 2.38561 |
| 212 | −0.01414 | 0.00794 | −0.00929 | 0.01548 | 0.37135 | 0.01239 | 0.04686 | −0.00269 | 2.4 | 2.38248 |
| 213 | 0.00043 | 0.00043 | 0.00043 | −0.00128 | 0.52723 | −0.00171 | −0.00171 | 0.00171 | 2.4 | 2.39883 |
| 214 | −0.00172 | −0.00141 | 0.00149 | 0.00164 | 0.65527 | 0.00626 | 0.00046 | 0.00015 | 2.4 | 2.40742 |
| 215 | −0.00285 | −0.00258 | 0.00251 | 0.00292 | 0.72763 | 0.01086 | 0.00069 | −0.00014 | 2.4 | 2.40688 |
| 216 | −0.00291 | −0.00243 | 0.00291 | 0.00243 | 0.6182 | 0.01068 | 0.0 | 0.00097 | 2.4 | 2.39848 |

TABLE 2

| | | Predicted | | | | |
|---|---|---|---|---|---|---|
| actual | | 1.6+ | 1.8+ | 1.9+ | 2.1+ | 2.2+ |
| 1.6+ | 108 | 102 | 5 | 1 | 0 | 0 |
| 1.8+ | | 0 | 0 | 0 | 0 | 0 |
| 1.9+ | | 0 | 0 | 0 | 0 | 0 |
| 2.1+ | | 0 | 0 | 0 | 0 | 0 |
| 2.2+ | 108 | 0 | 3 | 4 | 2 | 99 |

Having now described our invention what we claim is:

1. A method of determining the inflation pressure of one or more pneumatic tires on a moving vehicle having a plurality of n wheels fitted with tires comprising the steps of:

performing a set-up procedure including, for a range of tire inflation pressures including all the vehicles tires at their scheduled inflation pressure and combinations of one or more tires at a range of pressures below their scheduled pressure and for a range of vehicle speeds and driving conditions to include accelerating, braking, straight-ahead driving and cornering, the steps of:

deriving for each of the wheels a set-up speed value Cn proportional to the wheel angular velocity, determining the relationship of the set of set-up speed values Cn to the set of tire pressures by means of teaching a trainable neural network information processing system having an input layer of neurodes and an output layer of neurodes to map the set-up speed values onto the set of tire pressures by deriving from each set of set-up speed values intermediary speed parameters each derived from at least two of the set of set-up speed values and inputting each intermediary speed parameter to a different neurode of the input layer of neurodes and taking the inflation pressure of each of the tires from a different neurode of the output layer of neurodes and storing in a data storage means the determined relationship of the set of set-up speed values to each of related tire pressures, and subsequently in normal driving monitoring, in subsequent normal driving, at intervals of time, the wheel speed signals of the wheels on the vehicle, deriving an equivalent set of normal driving speed values based on these monitored wheel speed signals, and obtaining the associated tire inflation pressures by using the determined relationship stored in the data storage means.

2. The method according to claim 1, wherein the intermediary speed parameters comprise an average speed parameter (A) which is calculated as the sum of each of the wheel speed values Cn divided by the number of wheels n and parameters related to the speed of each wheel n.

3. The method according to claim 1, wherein the speed parameters comprise a parameter relating to the difference in the sum of wheel speed values of wheels positioned at the front of the vehicle and those at the rear of the vehicle.

4. The method according to claim 1, wherein the speed parameters comprise a parameter relating to the difference in the sum of wheel speed values Cn of wheels on the left side of the vehicle and those on the right side of the vehicle.

5. The method according to claim 1, wherein the vehicle has four wheels.

6. The method according to claim 1, wherein the trained information processing system is carried out by means of a neurocomputer.

7. The method of detecting a deflated tire or tires on a vehicle comprises obtaining values for the tire inflation pressures according to claim 1, then comparing each of the identified tire inflation pressures with the required scheduled inflation pressure of that tire and when one or more of the stored tire inflation pressures is lower than the required inflation pressure operating an alarm to warn that one or more tires of the vehicle are deflated.

8. The method according to claim 1, wherein the speed parameters comprise a parameter related to the difference in the sum of wheel speed values Cn of diagonally opposed groups of wheels.

9. The method according to claim 8, wherein the vehicle has four wheels and the speed parameters comprise eight speed parameters CP1, CP2, CP3, CP4, CP5, CP6, CP7, CP8 wherein $CP1 =$ Average speed parameter $A = (C1+C2+C3+C4)/4$ $CP2 = 1-(C1/A)$ $CP3 = 1-(C2/A)$ $CP4 = 1-(C3/A)$ $CP5 = 1-(C4/A)$ $CP6 = ((C1+C2)-(C3+C4))/A$ $CP7 = ((C1+C3)-(C2+C4))/A$ $CP8 = ((C1+C4)-(C2+C3))/A$ wherein C1, C2, C3, C4 are the respective wheel speed values of left front wheel, right front wheel, left rear wheel and right rear wheel of the vehicle.

10. The method according to claim 1, wherein the vehicle has two wheels.

11. The method according to claim 10, wherein said performing of a set-up procedure further includes deriving a speed value $C_{NSD}$ proportional to suspension deflection.

12. The method according to claim 1, wherein the neural network comprises additional plural hidden layers of neurodes.

13. The method according to claim 12, wherein the neural network is a Multi-Layer Perceptron Network.

14. The method according to claim 13, wherein the Multi-Layer Perceptron Network comprises an input layer of neurodes, an output layer of neurodes and two hidden layers of neurodes.

15. The method according to claim 1, wherein the wheel speed values Cn are calculated as the number of signal counts or pulses in a predetermined interval of time from each of the wheel signal generators of an electronic anti-lock braking system.

16. The method according to claim 15, wherein the wheel signal generators produce 96 pulse per revolution of wheel.

17. The method according to claim 15, wherein the interval of time is 5 seconds.

* * * * *